United States Patent
Schorr

(10) Patent No.: US 7,329,713 B2
(45) Date of Patent: Feb. 12, 2008

(54) COATING, LAMINATING, AND CASTING COMPOSITIONS AND METHODS OF PRODUCING AND CURING SAME

(76) Inventor: Ronald A. Schorr, 6802 E. Chaparral, Paradise Valley, AZ (US) 85253

( * ) Notice: Subject to any disclaimer, the term of this patent is extended or adjusted under 35 U.S.C. 154(b) by 257 days.

(21) Appl. No.: 10/851,796

(22) Filed: May 21, 2004

(65) Prior Publication Data

US 2005/0261464 A1 Nov. 24, 2005

(51) Int. Cl.
*C08F 118/04* (2006.01)
(52) U.S. Cl. ............... 526/319; 526/317.1; 526/307.6; 526/220; 526/236; 526/142; 526/88; 522/130; 522/101; 522/182; 522/121
(58) Field of Classification Search ............ 526/317.1, 526/319, 307.6, 220, 236, 142, 88; 522/130, 522/101, 182, 121
See application file for complete search history.

(56) References Cited

U.S. PATENT DOCUMENTS 5,773,487 A * 6/1998 Sokol .................... 522/42
6,005,017 A * 12/1999 Daly et al. .................... 522/20

FOREIGN PATENT DOCUMENTS

EP 0 636 669 A2 * 7/1994

* cited by examiner

*Primary Examiner*—Ling-Sui Choi
(74) *Attorney, Agent, or Firm*—Booth Udall, PLC

(57) ABSTRACT

Zero VOC compositions are described and may include: one of vinyl ester solids, unsaturated polyester solids (e.g., isophthalic polyester, orthophthalic polyester, terephthalic polyester, and mixtures thereof), and mixtures thereof; polymerizable solids (e.g., a monomer, an oligomer, and mixtures thereof); and/or at least one photochemical catalyst. Zero VOC compositions may be produced by: heating polymerizable solids to a range of about 300° F. to about 500° F.; and adding one of vinyl ester solids, unsaturated polyester solids, and mixtures thereof. Additional steps may include reducing the heat to about 70° F. to about 100° F. and adding at least one photochemical catalyst and/or at least one additive. Zero VOC compositions may be curable without requiring evaporation of a VOC there from upon exposure to ultraviolet light and/or mixing with at least one thermal catalyst.

8 Claims, No Drawings

COATING, LAMINATING, AND CASTING COMPOSITIONS AND METHODS OF PRODUCING AND CURING SAME

BACKGROUND

1. Technical Field

This document relates to zero VOC coating, laminating, and casting compositions.

2. Background Art

Compliance with environmental regulations is a significant issue in the coating, laminating, and casting industries. Volatile organic compounds (VOCs), such as styrene, are typically used in conventional compositions and are released as hazardous air pollutants (HAPs) during mixing, processing, curing, and fielding.

VOCs pose significant fire hazards, which makes fire insurance difficult and expensive to obtain for companies. Furthermore, VOCs pose potential health hazards. Moreover, VOCs are considered a hazard to clean air contributing to ozone (smog) formation.

Accordingly, VOCs have gained the attention of governmental regulators on the federal (e.g., EPA), state (e.g., EPA), regional (e.g. Air Quality Management Districts such as the South Coast Air Quality Management District (SCAQMD) of Southern California), and local levels. Regulations limit the amount of VOCs emitted that are acceptable. Since many companies cannot comply with these regulations, they are forced to either lower their production or install/operate an emission control system at a cost of millions of dollars to remove or reduce styrene emissions.

SUMMARY

In one aspect, the invention features a zero VOC coating, laminating, or casting composition may include polymerizable solids and one of vinyl ester solids, unsaturated polyester solids, and mixtures thereof. The composition may be curable without requiring evaporation of a VOC there from upon exposure to ultraviolet light and/or mixing with at least one thermal catalyst. Implementations may include one or more of the following. The unsaturated polyester solids may be one of isophthalic polyester, orthophthalic polyester, terephthalic polyester, and mixtures thereof. The polymerizable solids may be one of a monomer, an oligomer, and mixtures thereof. The composition may further comprise at least one photochemical catalyst which initiates a polymerization reaction in the composition when it is exposed to ultraviolet light. The composition may further comprise at least one additive.

In another aspect, the invention features a method of producing a zero VOC coating, laminating, or casting composition may include: heating polymerizable solids to a range of about 300° F. to about 500° F.; and adding one of vinyl ester solids, unsaturated polyester solids, and mixtures thereof. Implementations may include additional steps, such as heating the polymerizable solids and the vinyl ester solids, the unsaturated polyester solids, or the mixtures thereof to a range of about 70° F. to about 100° F. and adding at least one photochemical catalyst and/or at least one additive.

In still another aspect, the invention features a method of curing a zero VOC coating, laminating, or casting composition may include one of: exposing the composition to ultraviolet light; mixing the composition with at least one thermal catalyst; and mixing the composition with at least one thermal catalyst and exposing the composition to ultraviolet light.

These and other implementations of the invention may have one or more of the following advantages. Coating, laminating, and casting compositions may cure very quickly upon exposure to ultraviolet light and/or mixing with thermal catalysts. Coating, laminating, and casting compositions may be formed of solids, free or substantially free of VOCs, and in compliance with even the strictest regulations. Coating, laminating, and casting compositions may be versatile dual curable compositions that may not require evaporation of any VOCs. Coating, laminating, and casting compositions may have a reduced odor and may not require any extra equipment to use (e.g. respiratory equipment). Coating, laminating, and casting compositions may also provide regulatory compliance, increased production capabilities, solvent resistance, durability, flexibility, controllable viscosity, and/or the like.

The foregoing and other aspects, features, and advantages will become apparent from the following description and claims.

DESCRIPTION

1. Overview

Zero VOC composition implementations described here may include polymerizable solids (e.g., monomers and/or oligomers) and one of vinyl ester solids, unsaturated polyester solids, and mixtures thereof. They may also include at least one photochemical catalyst and/or at least one additive (e.g., a filler, a reinforcement, a promoter/accelerator, an optical brightener, an opacifying pigment, a thickener, an air release, a defoamer, a grinding aid, a blue dye, a colorant, an inhibitor, and/or an antioxidant), as well as other ingredients included in the examples. They may be made using conventional procedures or other procedures described here. They may be cured using conventional procedures or other procedures described here quickly upon exposure to ultraviolet light and/or mixing with thermal catalysts.

Accordingly, zero VOC composition implementations described here may be much less hazardous to the environment than previously available compositions requiring VOCs to evaporate into the atmosphere in order to cure. Moreover, because of the low molecular weight polymerizable solids, which take the place of VOCs, but which also participate and contribute to final polymer properties, zero VOC composition implementations may have the ability to control viscosity. With respect to coatings for example, since viscosity may be controlled, coating composition implementations may be used as a stain or sealant for example. In addition, when coating composition implementations are used on porous substrates such as wood, concrete or SMC, speed of penetration is a direct function of viscosity. Therefore, by controlling viscosity, depth and speed of penetration before curing may be controlled, and upon curing, the coating composition implementations may polymerize in and about the substrate, providing adhesion thereto.

It will be understood that any description relating to coating compositions is for the exemplary purposes of this disclosure, and it will be understood that implementations may also produce and cure laminating compositions, casting compositions, composite compositions, and the like as well. Moreover, it will be understood that implementations are not limited to the specific coating, laminating, and casting compositions, coating, laminating, and casting composition production and curing methods, and the like disclosed. Consistent with the intended operation and use of method implementations for producing and curing coating, laminating, and casting compositions, virtually any coating, laminating, and casting compositions, coating, laminating, and casting composition production and curing methods, and other components may be utilized.

2. Terminology and Definitions

In describing composition, production, and curing implementations, the following terminology will be used in accordance with the definitions and explanations set out below. Notwithstanding, other terminology, definitions, and explanations may be found throughout this document as well.

A "polymer" is a term used in its broadest sense and may refer to: any high-molecular weight substance, the molecules of which consist of one or more types of structural units (e.g., monomer repeat units) repeated any number of times; any large molecule produced by any chemical process (e.g., condensation in which water or other products are produced) such as alkyd resins (e.g., polyester resins). The "degree of polymerization (DP)" of a polymer may refer to the number of monomer units joined together in the polymer.

Thermosetting polymers are the most diverse and widely used of all man-made materials. They are easily poured or formed into any shape, are compatible with most other materials, and cure readily into an insoluble solid usually with a crosslinked network structure. The cross-linking reaction during cure is irreversible and, unlike the thermoplastics, crosslinking provides thermal stability such that polymer will not soften, melt, or flow upon heating. Thermosetting polymers are also excellent adhesives and bonding agents.

A "resin" is a term used in its broadest sense and may refer to any solid, semisolid, or pseudosolid material with indefinite and often high molecular weight and a softening or melting range that exhibits a tendency to flow when subjected to stress. As composite matrices, resins bind together reinforcement fibers. High molecular weight synthetic resins are more generally referred to as "polymers". In a broad sense, resin may refer to any polymer that is the basic material for final products, such as coatings, laminates, and castings.

A "polymer or resin composition or system" is a term used in its broadest sense and may refer to any mixture of resin and ingredients required for an intended processing method and final product. Polyester resins are the most widely used resin systems.

"Polyester" is a term used in its broadest sense and may refer to one of the largest classes of thermoset polymers. Polyester is a special type of alkyd polymer in which the monomer units are linked by the group —COO— (ester linkage). That is, polyesters are any group of synthetic resins which are polycondensation products of unsaturated or saturated dibasic organic acids or anhydrides with polyhydric alcohols. Polyester resins may also be meant to include the cross-linking oligomer(s) and/or monomer(s) associated with the polyester molecules. The oligomer(s) and/or monomer(s) associated with the polyester molecules facilitate casting or shaping of the resin into a desired form before curing to rigid solids. Crosslinking may be carried out by free radical addition polymerization of the oligomer(s) and/or monomer(s).

A cure site monomer, such as maleic anhydride, may be incorporated to provide unsaturation within the polyester backbone. Unsaturated polyesters provide the foundation for developing crosslinked polyesters. The unsaturated double bonds occurring inside the polyester backbone may react via a chain polymerization mechanism to form a crosslinked polyester network. That is, an unsaturated polyester formed by condensation polymerization may be added to a mixture of oligomer(s) and/or monomer(s) and radical catalyst(s) (thermal and/or photochemical). During the initiation step and upon heating and/or irradiation, a catalyst dissociates to form two radicals which may attack the unsaturations (the double bonds) in the polyester or the oligomer(s) and/or the monomer(s) and add to them to form reactive radical centers. A chain polymerization reaction is then begun which yields a crosslinked oligomer- and/or monomer-polyester copolymer. The oligomer(s) and/or monomer(s) provide the crosslinks between the polyester chains to form a thermoset polymer.

Unsaturated polyester resins form highly durable structures and coatings when they are cross-linked with a reactive oligomer and/or monomer. The properties of the cross-linked unsaturated polyester resins depend on the types of acids and glycols used and their relative proportions. Cured resin exhibits excellent resistance to outdoor weather, rising temperatures, immersion to cold or hot water or exposure to chemicals and is electrically non-conductive.

An "isophthalic polyester or resin" is a term used in its broadest sense and may refer to any unsaturated polyester prepared with isophthalic acid as the starting acid constituent. Isophthalic resin is now becoming the material of choice in industries such as marine where its superior water resistance is desirable. Useful to implementations may be any of the isophthalic solid resins provided by and through Eastman Chemical Company.

An "orthophthalic polyester or resin" is a term used in its broadest sense and may refer to any unsaturated polyester of which phthalic anhydride was the starting point. Orthophthalic resin is the standard economic resin used by many people. Useful to implementations may be any of the orthophthalic solid resins provided by and through Eastman Chemical Company.

A "terephthalic polyester or resin" is a term used in its broadest sense and may refer to any unsaturated polyester prepared with terephthalic acid as the starting acid constituent. Useful to implementations may be any of the terephthalic solid resins provided by and through Eastman Chemical Company.

A "vinyl ester" is a term used in its broadest sense and may refer to one of the largest classes of thermoset polymers. Vinyl esters may be any group of synthetic resins which are synthesized from an unsaturated carboxylic acid (e.g., methacrylic acid) and an epoxy resin. They differ from polyesters in having only terminal unsaturation (rather than inside the chain), pendant hydroxyl groups, and no carboxyl or hydroxyl end groups. Thus, vinyl esters are similar in their molecular structure to polyesters, but differ primarily in the location of their reactive sites, these being positioned only at the ends of the molecular chains. Since the whole length of the molecular chain is available to absorb shock loadings, this makes vinyl esters tougher and more resilient than polyesters. The vinyl ester molecule also features fewer ester groups. Ester groups are susceptible to water degradation by hydrolysis which means that vinyl esters exhibit better resistance to water and many other chemicals than their polyester counterparts, and may be found in applications such as pipelines and chemical storage tanks. Vinyl esters may also be used as a barrier coating for a polyester laminate that is to be immersed in water, such as in a boat hull for example.

"Solids" is a term used in its broadest sense and may refer to any nonvolatile matter in a composition.

"Polymerizable" is a term used in its broadest sense and solids refer to monomers and/or oligomers. As described above, oligomer(s) and/or monomer(s) provide the crosslinks between the polyester chains to form a thermoset polymer during a chain polymerization reaction. Moreover, monomers and oligomers give the cured coating, laminate, or casting most (but not all) of its physical performance characteristics like abrasion resistance, adhesion, flexibility, hardness, pigment dispersion, chemical resistance, any combinations thereof, and the like.

"Monomer" is a term used in its broadest sense and may refer to any substance composed of low molecular weight molecules capable of reacting with like or unlike molecules to form a polymer; the smallest repeating structure of a polymer. Monomers may generally contain carbon and hydrogen with, sometimes, other elements such as oxygen, nitrogen, chlorine, or fluorine for example.

A "monomeric unit or mer" is a term used in its broadest sense and may refer to the smallest repeating structural unit of any high polymer molecule containing the same kinds and numbers of atoms as the monomer.

An "oligomer" is a term used in its broadest sense and may refer to any substance composed of molecules containing only two, three, or a few monomeric units capable of reacting with like or unlike molecules to form a polymer. Oligomers fall into several main classes, including epoxy acrylates, aromatic urethane acrylates, aliphatic urethane acrylates, polyether acrylates, and polyester acrylates for example.

Epoxy acrylates are the most common class of energy curable oligomers, mainly because they are also the lowest cost class of oligomer (less than the cost of virtually all other oligomers). Use of epoxy acrylates does result in fast curing, hard and chemical resistant coatings, laminates, and castings. However, they do lack in pigment wetting, flexibility, adhesion to difficult substrates, and are very high in viscosity. Most epoxy acrylates (even modified products) are based on bisphenol-A diglycidyl ether type epoxides. Modified epoxy acrylates are available to improve performance like fatty acid modified versions (better pigment wetting), chain extended versions (better flexibility) and aliphatic epoxy acrylates (lower viscosity).

Aromatic urethane acrylates are all based on toluene diisocyanate (TDI) and polyols. Aromatic urethane acrylates give excellent balance of flexibility and hardness, resulting in tough, abrasion resistant coatings, laminates, and castings. There is such a wide array available that summarizing their performance is difficult. General physical properties may range from extremely hard and abrasion resistant (but inflexible) to very elastomeric and soft, and therefore best suited for adhesive applications. Flex and hardness is generally dictated by molecular weight and functionality, but the choice of backbone has a great effect as well. Some have excellent pigment wetting characteristics and many give excellent adhesion to difficult substrates like plastics and metals. Since they have aromatic backbone, they are not recommended for applications requiring exterior durability and non-yellowing performance.

Aliphatic urethane acrylates are based on a variety of aliphatic diisocyanates. Aliphatic urethane acrylates are the highest performance materials available. They have similar properties to aromatic urethane acrylates, but the wider choice of isocyanate available results in the possibility of lower viscosity and more flexible products. They have excellent outdoor durability and UV resistance, so may be widely used in these applications.

Polyether acrylates, the least viscous group, are made by esterifying polyetherols with acrylic acid. These usually do not require thinning. They may be made more reactive by tacking on amine groups.

Polyester acrylates are another class of oligomers for use in energy curable coatings, laminates, and castings. Fatty acid modified polyester acrylates may be widely used here since they have the best broad-based wetting and dispersion of organic pigments. Other polyester acrylates (not designed for pigment wetting) may be used for flexibility and adhesion (but are soft), and tend to be lower cost than most other oligomers (except epoxy acrylates).

Exemplary monomers and/or oligomers include, but are not limited to, monoacrylates, diacrylates, triacrylates, polyacrylates, epoxy acrylates, aromatic urethane acrylates, aliphatic urethane acrylates, polyether acrylates, polyester acrylates, melamine acrylates, acrylic acrylates, any combinations thereof, and the like. More specifically, exemplary monomers and/or oligomers include, but are not limited to, methyl acrylate, vinyl acetate, acrylinonitrile, n-butyl acrylate, ethyl acrylate, hydroxyethyl acrylate, hydroxyethyl methacrylate, pentaerythritol triacrylate, phenoxy ethyl acrylate (PEA), beta carboxy ethyl acrylate, ethoxyethoxyethyl acrylate (EOEOEA), 6M-ethoxylated 3M-hydroxyethyl methacrylate, cyclic trimethylolpropane formal monoacrylate (CTFA), isodecyl acrylate (IDA), isobornyl acrylate, octyldecyl acrylate, oxyethylated phenol acrylate, glycol monomethacrylate, 6M-ethoxylated 3M-hydroxyethyl methacrylate, propylene glycol monoacrylate, propylene glycol monomethacrylate, odipropylene glycol diacrylate, 1,6-hexanediol diacrylate (HDDA or HDODA), tripropylene glycol diacrylate (TPGDA or TRPGDA), dipropylene glycol diacrylate (DPGDA), propoxylated neopentyl glycol diacrylate (PONPGDA or NPGPODA), propoxylated glycerol triacrylate, PEG200 diacrylate, ethoxylated phenol acrylate, acrylated epoxy bisphenol-A diacrylate (EO-BADA), trimethylolpropane triacrylate (TMPTA), ethoxylated TMPTA (EOTMPTA or TMPEOTA), trimethylolpropane trimethacrylate, glycerol propoxylate triacrylate (GPTA), alkoxylated pentaerythritol tetraacrylate (PPTTA), pentaerythritol tri-tetraacrylate (PETA), dipentaerythritol pentaacrylate (DPPA), dipentaerythritol hydroxylpentaacrylate, ditrimethylolpropane tetraacrylate (di-TMPTA), any combinations thereof, and the like.

An "additive" is a term used in its broadest sense and may refer to any material that enhances the production, cure, application, final performance properties, appearance, and/or the like of the coating composition, laminate composition, and/or casting composition. Exemplary additives include, but are not limited to, a filler, a reinforcement, a promoter/accelerator, an optical brightener, an opacifying pigment, a thickener, an air release, a defoamer, a grinding aid, a blue dye, a colorant, an inhibitor, an antioxidant, any combination of the foregoing, and/or the like.

A "filler" is a term used in its broadest sense and may refer to any compounding ingredient, possibly in dry, powder form, added in substantial amount to improve quality, increase viscosity, improve appearance, and/or lower density and cost without significantly modifying mechanical properties. Filler materials may be used extensively with polyester resins for a variety of reasons including: to reduce the cost of the casting; to facilitate the casting process; and to impart specific properties to the casting. Fillers may be added in quantities up to 90% of the resin weight although such addition levels may affect the flexural and tensile strength of the laminate. The use of fillers may be beneficial in the laminating or casting of thick components where otherwise considerable exothermic heating may occur. Addition of certain fillers may also contribute to increasing the fire-resistance of the laminate. Exemplary fillers include, but are not limited to, talc, glass spheres, barium sulfate, calcium sulfate, calcium carbonate, silica, magnesium silicate, aluminum silicate, magnesium alumino-silicate, synthetic amorphous sodium alumino-silicate, sodium potassium alumino-silicate, aluminum trihydrate, nepheline syenite, mica (phogopite and muscovite mica), bentonite, fumed allumina, colloidal attapulgite, any combinations thereof, and the like.

A "reinforcement" is a term used in its broadest sense and may refer to any material that increases the mechanical properties of a thermosetting resin such as fibers. Fiber morphologies may include continuous strand, woven, roving, and/or chopped fibers; the nature of the fiber used depends on the application of the thermosetting resin. Exemplary reinforcements include, but are not limited to, glass fibers, carbon fibers, aramid fibers, any combinations thereof, and the like.

A "promoter/accelerator" is a term used in its broadest sense and may refer to any substance whose presence increases the rate of a chemical reaction, such as the curing or cross-linking of a resin system. Promoters/accelerators may be used in free radical polymerizations, curing thermosetting resins, as cross-linking agents, and for polymer modification. Promoters/accelerators may be added to a catalyzed resin to enable the reaction to proceed at room temperature within a practical time period and/or at a greater rate. Since promoters/accelerators have little influence on the resin in the absence of a thermal catalyst for example, they may be added to the resin to create a "pre-promoted or -accelerated" resin. Exemplary promoters/accelerators include, but are not limited to, metals, metal salts, organometallics, selected amine materials, any combinations thereof, and the like. More specifically, exemplary promoters/accelerators include, but are not limited to, cobalt, zinc, potassium, magnesium, zirconium, calcium, cobalt naphthenate (CoNap) (in combination with MEKP), dimethyl aniline (DMA) (in combination with BPO and MEKP), any combinations thereof, and the like.

An "optical brightener" is a term used in its broadest sense and may refer to any colorless to weakly colored organic compound (e.g. fluorescent dyes or pigments) that absorbs ultraviolet light and re-emits most of the absorbed energy in the visible violet-to-blue fluorescent light. Materials that evenly reflect most of the light at all wave-lengths striking their surface appear white to the human eye. Synthetic fibers, for example, generally absorb more light in the blue region of the visible spectrum (blue defect) than in others because of impurities or due to the thermal history during the manufacturing process. As a result, synthetic fibers such as polyester take on an unwanted, yellowish cast. Optical brighteners offset the yellowish cast and at the same time improve lightness because their bluing effect is based on adding blue light. The effectiveness of an optical brightener is dependent upon the type of substrate, processing conditions and possible interactions with other components in the formulation such as white pigments or UV absorbers. In general, optical brighteners may be effective at very low concentrations. Exemplary optical brighteners include, but are not limited to, any of the optical brighteners provided by and through Ciba under the mark UVITEX.

An "opacifying pigment" is a term used in its broadest sense and may refer to any high-opacity, bright white pigment that gives opacity and whiteness to coatings, laminates, and castings, and that may absorb or reflect harmful radiation. Exemplary opacifying pigments include, but are not limited to, titanium dioxide and the like.

A "thickener" is a term used in its broadest sense and may refer to any additive used to thicken (increase viscosity) or modify the deformation and flow of a coating, laminate, or casting. Exemplary thickeners include, but are not limited to, fumed metal oxides, such as fumed alumina and fumed silica (e.g., the fumed silica provided by and through Cabot Corporation under the mark CAB-O-SIL® or the fumed silica provided by and through Degussa under the mark Aerosil®), attapulgite clay and other types of clay, titanate chelating agents, any combinations thereof, and the like.

An "air release" is a term used in its broadest sense and may refer to any additive that prevents bubble formation, air inclusions, and/or porosity during the manufacture and application of a coating, laminating, or casting composition so that blisters and pinholes are avoided and smooth surfaces are achieved. Exemplary air releases include, but are not limited to, polysiloxanes, such as methyloxysiloxane, polyether modified dimethylpolysiloxane, polyether modified methylalkylpolysiloxane, any combinations thereof, and the like. Useful to implementations may be any of the air releases provided by and through Bergen Chemical Corporation, such as BMC-888.

A "defoamer" is a term used in its broadest sense and may refer to any additive used to reduce or eliminate foam formed in a coating, laminate, casting, and/or constituent thereof. Defoamers may also promote the flow and leveling of the coating, laminate, or casting. Exemplary defoamers include, but are not limited to, silicone-based and mineral oil-based defoamers, any combinations thereof, and the like. Useful to implementations may be any of the defoamers provided by and through Bergen Chemical Corporation, such as silicone copolymer BMC-1040S.

A "dispersant or grinding aid" is a term used in its broadest sense and may refer to any surface-active substance used to facilitate and stabilize the dispersion of solid compounding materials. Exemplary grinding aids include, but are not limited to, BYK®-P 105, and the like.

A "blue dye or toner" is a term used in its broadest sense and may refer to any pigment or dye used in small quantities to neutralize the yellow cast of certain white pigments or coatings, increasing apparent whiteness; also used to make black coatings more jet black. Exemplary blue dyes include, but are not limited to, any of the blue dyes provided by and through Sycam, CIBA, or Mitsubishi.

A "colorant" is a term used in its broadest sense and may refer to any substance that imparts color to another material or mixture. Colorants may be either dyes or pigments. It may be wise to carefully consider the choice of a colorant, as it is easy to affect the curing reaction and degrade the final product by use of some colorants.

An "inhibitor" is a term used in its broadest sense and may refer to any compound or material which has the effect of slowing down or stopping a chemical change such as polymerization for example.

An "antioxidant" is a term used in its broadest sense and may refer to any compound or material which prevents oxygen from reacting with other compounds and materials which are susceptible to oxidation.

A "composition" is a term used in its broadest sense and may refer to any mixture of a polymer with other ingredients, such as monomers, oligomers, catalysts, additives, any combinations thereof, and/or the like.

A "volatile organic compound (VOC)" is a term used in its broadest sense and may refer to any organic compound which participates in atmospheric photochemical reactions; any carbon-containing chemical compounds (e.g., solvents and styrene) that evaporate readily at ambient temperatures or elevated temperatures. Environmental, safety, and health regulations limit exposure to these compounds, so reduced or zero VOC content is desirable.

A "zero VOC composition" is a term used in its broadest sense and may refer to a composition, such as a coating, laminating, or casting composition, which does not contain any organic chemical compounds that evaporate readily at ambient temperatures or elevated temperatures.

A "coating" is a term used in its broadest sense and may refer to any liquid, liquefiable, or mastic composition which is converted into a solid protective, decorative, or functional adherent film after application. Coatings may be distinguished based on their end-use application characteristics. Possible methods of application for coating composition implementations include spraying, brushing, curtain coating, dipping, rolling, nonatomizing application techniques (e.g., flowcoaters, pressure-fed rollers, resin impregnators, hand lay-up applications), and/or the like.

A "gel coating" is a term used in its broadest sense and may refer to any thin, outer layer of resin, sometimes with pigment, applied to reinforced plastic laminates or castings for example; for example, a high-build, chemical-resistant, thixotropic polyester coating. The most common finish used on fiber reinforced polyester resin is gel coat. Apart from affording protection to the structural casting or laminate, gel coats improve durability, reduce fiber pattern on the surface and provide a finished surface from the casting, thereby eliminating the need to paint. A range of gel coats may be developed to meet demands other than simply water resistance, for example, for mold making and for fire resistance. In addition, gel coats may be supplied colored to a standard color range or matched to meet specific customer needs. Gel coats may be made available in brush and spray versions for example and may be put down at a thickness of about 0.5 mm (approximately 500 g/m$^2$). If they are too thin, poor cure occurs and fiber pattern will result. If they are too thick, crazing and cracking may occur and the laminate will be more susceptible to reverse impact, star cracking damage. A variety of base polyester resins may be used to manufacture gel coats such as isophthalic acid type resins. The choice of isophthalic acid based resins rather than orthophthalic acid based resins results from the superior water resistance of isophthalic acid based resins, their superior blister resistance and their superior toughness as indicated by their excellent tensile elongation to break compared to orthophthalic acid based resins.

A "barrier coating" is a term used in its broadest sense and may refer to any intermediate coating compatible with a filler coating and a finish coating (e.g., a gel coating) that is not compatible with any coating used to isolate and/or bond a finish coating (e.g., a gel coating) from and/or to the surface to which it is applied in order to prevent chemical or physical interaction between them. Another function of a barrier coating may be to reduce or delay the ingress of the environment into the structural laminate. Barrier coatings may be non-structural and may be manufactured from a different resin to that used for constructing the structural laminate or casting. The barrier coating may be constructed using surface tissue, which may be based on fillers, such as mineral fillers or glass or polymer fibers depending upon the environment to be continued, supported by several layers of laminate to a thickness of a least 3 mm.

A "filler coating" is a term used in its broadest sense and may refer to any coating used as a primer. That is, a filler coating may be the first complete coating applied to an uncoated surface before an application of a barrier coating and/or a finish coating (e.g., a gel coating). Filler coatings may be designed to provide adequate adhesion to new surfaces and may be formulated to meet special requirements of the surfaces. Types of filler coatings may vary depending upon the surface, its condition, and any barrier coating and/or finish coating (e.g., gel coating) to be used.

A "laminate" is a term used in its broadest sense and may refer to any product made by bonding together two or more layers of material or materials. Lamination is an environmentally open process, unlike casting which is an environmentally closed process as described below. Care may be used in the preparation of the laminating resin composition before laminating. The resin and any additives may be mixed (e.g. agitated) to disperse all the components evenly before any thermal catalyst is added and/or it is irradiated for example. This mixing may be thorough as any air introduced into the resin composition may affect the quality of the final laminate. This is especially so when laminating with layers of reinforcing materials as air bubbles may be formed within the resultant laminate which may weaken the structure. Additionally, the promoter(s)/accelerator(s) and catalyst(s) may be added in carefully measured amounts to control the polymerization reaction to give the best material properties. Thus, resins may be formulated to the laminator's requirements ready simply for the addition of any thermal catalyst (s) if desired, in addition to any photochemical catalysts already included therein for example, before laminating.

A "casting" is a term used in its broadest sense and may refer to anything cast in a mold for example. For use in casting, one of vinyl ester solids, unsaturated polyester solids, and mixtures thereof may be supplied in their basic form or with any monomers, oligomers, catalysts, fillers, reinforcements, and/or other additives already included. These components improve specific properties or characteristics in the resin, such as hardness, density, impact strength, temperature and chemical resistance, thermal conductivity, abrasion resistance, strength, and EMI shielding. As with laminating, care may be used in the preparation of the casting resin composition before casting. The resin and any additives may be mixed (e.g. agitated) to disperse all the components evenly before any thermal catalyst is added and/or it is irradiated for example. This mixing may be thorough as any air introduced into the resin composition may affect the quality of the final casting. Additionally, as with laminating, the promoter(s)/accelerator(s) and catalyst (s) may be added in carefully measured amounts to control the polymerization reaction to give the best material properties. Thus, resins may be formulated to the caster's requirements ready simply for the addition of any thermal catalyst(s) if desired, in addition to any photochemical catalysts already included therein for example, before casting.

The resin casting process allows manufacturers to produce high quality, complex parts economically and at a low volume. Resin casting captures all details, from threads and textures to high-gloss finishes, straight from the mold, usually without expensive secondary processes. Parts may be produced in any color. The process may begin with a male pattern, usually made of aluminum, which may be fastened to a flask. A mold may be made by pouring into the pattern a liquid mold material. The casting resin composition may then be poured into the mold to produce a part.

A "composite" is a term used in its broadest sense and may refer to any material which is composed of at least two elements working together to produce material properties that are different to the properties of those elements on their own; two or more materials that are solid in the finished state, are mutually insoluble, and differ in chemical nature. In practice, most composites consist of a bulk material (the "matrix"), and a reinforcement of some kind, added primarily to increase the strength and stiffness of the matrix. This reinforcement is usually in fiber form. Polymer Matrix Composites (PMC's) are the most common. Also known as Fiber Reinforced Polymers (FRP's), these materials use a polymer-based resin as the matrix, mineral fillers, and/or a variety of reinforcements such as glass fibers, carbon fibers and aramid fibers. For example, cross-linked unsaturated polyester resins may be combined with fibers and/or mineral fillers before cross-linking to enhance their mechanical strength. Lightweight, durable, and resilient, FRP composites are exemplary for making any types of structural products in various sizes, shapes, thickness and colors. FRP composites may be consumed primarily by the construction, marine and automotive industries for tanks, fishing boats, septic tanks, and the like, although they find use in a variety of other applications. Cross-linked unsaturated polyester resin not reinforced with glass may be used to make gel coats, automotive repair putty, artificial marble, and miscellaneous other items like bowling balls and buttons.

"Mixing or blending" is a term used in its broadest sense and may refer to combining two or more materials to obtain a particular kind or quality; combining or associating so that the separate constituents cannot be distinguished.

"Agitation" is a term used in its broadest sense and may refer to any process of mixing to achieve homogeneity (of uniform composition throughout), but not necessarily dispersion. Accordingly, for example, agitation may be carried out by process flow (e.g. a static mixer). Static or motionless mixers may be comprised of fins, obstructions, or channels mounted in pipes, designed to promote mixing. The flow may be either divided, rotated, channeled, or diverted through each stage of the mixer. Static mixers may also be used to generate turbulence to enhance mixing. The power input to the mixing process is a result of pressure loss through the mixer. Static mixers may be used for blending after additive injection, blending for uniform temperature or concentration profiles, or multi-phase dispersion. Some types of mixers may be better for turbulent flow or laminar flow, while others work well over a wide range of fluid properties.

To "cure" or "curing" are terms used in their broadest sense may refer to changing the properties of a polymeric system via chemical reaction into a final, more stable, usable condition by the use of heat, radiation, reaction with chemical additives, and/or the like. On addition of a catalyst, a resin will begin to become more viscous until it reaches a state when it is no longer a liquid and has lost its ability to flow, i.e. the "gel point". The resin will continue to harden after it has gelled, until, later, it has obtained its full hardness and properties.

This reaction itself is accompanied by the generation of exothermic heat, which, in turn, speeds the reaction. The speed of cure is controlled by the amount of promoter/accelerator in a polyester resin. It is possible to accelerate the cure by the application of heat, so that the higher the temperature the faster the final hardening will occur. This may be most useful when the cure would otherwise take several hours or even days at room temperature. Curing at elevated temperatures has the added advantage that it actually increases the end mechanical properties of the material, and many resin systems will not reach their ultimate mechanical properties unless the resin is given this "postcure". The postcure involves increasing the temperature after the initial room temperature cure, which increases the amount of cross-linking of the molecules that may take place. To some degree this postcure will occur naturally at warm room temperatures, but higher properties and shorter postcure times will be obtained if elevated temperatures are used.

A "catalyst" is a term used in its broadest sense and may refer to any substance used to achieve the free radical polymerization of a resin within a practical period. Depending on the type, some catalysts may be added to a resin system shortly before use to initiate the polymerization reaction, while others may come premixed in a resin system. All free radical polymerization catalysts are not themselves free radicals, but rather precursors that generate the reactive radicals in situ. There are two main categories of free radical catalysts: thermal catalysts and photochemical catalysts.

Thermal free radical catalysts are the most common means for starting a free radical polymerization. The necessary precursors are compounds containing a weak bond that decompose on heating to form (usually) a pair of reactive free radicals. Generally, the decomposition proceeds with first order kinetics. The two most common forms are peroxides (R—O—O—R') and azo compounds (R—N=N—R'). Exemplary thermal catalysts include, but are not limited to, 2,2-azo-bis-isobutyronitrile, benzoyl peroxide (BPO), methyl ethyl ketone peroxide (MEKP), cumyl peroxide, cumene hydroperoxide, dicumyl peroxide, butadiene polyperoxide, azobisisobutyronitrile, acetyl peroxide, lauryl peroxide, t-butyl peracetate, t-butyl peroxide (TBP), t-butyl hydroperoxide, t-butyl perbenzoate, any of the proprietary metathesis catalyst systems and organo-catalyst systems produced by Materia Inc. of Pasadena, Calif., any combinations thereof, and the like.

Photochemical free radical catalysts generally contain a weak bond that may fragment upon absorption of the energy of a photon to produce two free radicals. Some thermal catalysts are also photochemical catalysts, and vice versa. Usually, the photochemical catalysts are activated by UV light (e.g., from natural sunlight, medium pressure mercury arc lights, long wave UV lights, and the like), but many systems working at visible wavelengths are also available. Exemplary photochemical catalysts include, but are not limited to, benzoin, benzil dimethyl ketal, cyclo hexyl phenyl ketones, acylphosphine oxides (APOs), bisacylphosphine (BAPO), 1-hydroxycyclohexyl phenyl ketone, bis(2,4,6-trimethylbenzoyl)-phenylphosphine oxide, 2-benzyl 2-dimethylamino 1-(4-morpholinophenyl)butanone-1,1-phenyl-2-hydroxy-2-methyl-1-propanone, oligo{2-hydroxy-2 methyl-1-[4-(methylvinyl)phenyl]propanone}, 2-hydroxy 2-methyl 1-phenyl propan-1 one, bis(2,6-dimethoxybenzoyl)-2,4,4-trimethylpentyl phosphine oxide, benzophenone, bis(n,5,2,4-cyclopentadien-1-yl)-bis [2,6-difluoro-3-(1H-pyrol-1-yl)phenyl]titanium, 2-benzyl-2-N,N-dimethyl amino-1-(4-morpholinophenyl)-1-butanone, 2-methyle-1-[4(methylthio)-2-morpholinopropan]-1-one, 4-(2-hydroxy)phenyl-2-hydroxy-2-(methylpropyl)ketone, 1-hydroxy cyclohexyl phenyl ketone benzophenone, (n-5,2,4-cyclopentadien-1-yl) [1,2,3,4,5,6-n)-(1-methylethyl) benzene]-iron(+) hexafluorophosphate (−1), 2,2-dimethoxy-2-phenyl-1-acetophenone 2,4,6-trimethyl benzoyl-diphenyl phosphine oxide, benzoic acid, 4-(dimethyl amino)-ethyl ether, any combinations thereof, and the like.

It will be understood that the specific exemplary components disclosed in the above definitions or throughout this disclosure are not limiting, as virtually any components consistent with the intended operation of producing and curing method implementations may be utilized. It will also be understood that the use of any or all of the specific exemplary components disclosed in the above definitions or throughout this disclosure are optional, provided that the components selected are consistent with the intended operation of producing and curing method implementations.

3. Detailed Description

As noted, this document enables the production of zero VOC compositions. Thus, the compositions hereof may be especially advantageous, as contrasted with the conventional compositions, in that they do not generate any organic volatile evaporative emission component during the curing process and further, do not require the evaporation of any oil, alcohol or water-based solvent to complete the curing process. Rather, the curing is effected by a rapid polymerization reaction which may be initiated by the admixing of a thermal catalyst and/or a photochemical catalyst of the composition when it is exposed to an energy source, such as direct sunlight, UV light, other natural or artificial UV light, and/or the like for example. Notwithstanding, in some implementations, minor amounts of VOCs and/or oil, alcohol or water-based solvents may be included.

Formulating coating, laminating, and casting compositions is complex—it is not simply a matter of mixing a few ingredients in different ratios. Rather, coating, laminating, and casting composition formulating involves the process of selecting and admixing appropriate ingredients in the correct proportions to provide a coating, laminating, or casting composition with specific processing and handling properties, as well as a final dry film or casting with the desired properties. Possible ingredients of coating, laminating, and casting composition implementations may include, but are not limited to, the following solids: one of vinyl ester solids, unsaturated polyester solids, and mixtures thereof; a monomer and/or an oligomer; a catalyst; a filler; a reinforcement; a promoter/accelerator; an optical brightener; an opacifying pigment; a thickener, an air release; a defoamer; a grinding aid; a blue dye; a colorant; an inhibitor; an antioxidant; any combinations thereof; and/or the like. Coating, laminating, and casting compositions formed from these ingredients may provide the properties characteristic of the amount of ingredient used.

Through empirical methods, it has been determined which blends of ingredients may be needed for specific coatings, laminates, or castings. Vinyl ester solids, unsaturated polyester solids, or mixtures thereof may be added from about 0% up to about 90% in a coating, laminating, or casting composition. Monomers and/or oligomers may be added from about 0% up to about 90% in a coating, laminating, or casting composition. Catalysts may be added from about 0% up to about 10% in a coating, laminating, or casting composition. Fillers (BOTM) may be added from about 0% up to about 90% in a coating, laminating, or casting composition. Reinforcements (BOTM) may be added from about 0% up to about 90% in a coating, laminating, or casting composition. Promoters/Accelerators may be added from about 0% up to about 5% in a coating, laminating, or casting composition. Thickeners may be added from about 0% up to about 5% in a coating, laminating, or casting composition. Colorants and other pigments may be added from about 0% up to about 60% in a coating, laminating, or casting composition. Other additives, such as air releases, defoamers, grinding aids, inhibitors, antioxidants, and the like may each be added from about 0% up to about 2% in a coating, laminating, or casting composition.

Composition implementations may be made using conventional or other procedures. Accordingly, although there are a variety of method implementations for producing coating, laminating, and casting compositions, for the exemplary purposes of this disclosure, a method implementation for producing a zero VOC coating, laminating, or casting composition may generally include: heating polymerizable solids to a range of about 300° F. to about 500° F.; and adding under agitation one of vinyl ester solids, unsaturated polyester solids, and mixtures thereof.

Heating polymerizable solids may involve any number of steps and implementing components, and heating polymerizable solids may be accomplished readily from this disclosure. For the exemplary purposes of this disclosure, heating polymerizable solids may comprise heating one of a monomer, an oligomer, and mixtures thereof, such as one of monoacrylates, diacrylates, triacrylates, polyacrylates, epoxy acrylates, aromatic urethane acrylates, aliphatic urethane acrylates, polyether acrylates, polyester acrylates, melamine acrylates, acrylic acrylates, and mixtures thereof. Even more specifically, the polymerizable solids may be one of methyl acrylate, vinyl acetate, acrylinonitrile, n-butyl acrylate, ethyl acrylate, hydroxyethyl acrylate, hydroxyethyl methacrylate, pentaerythritol triacrylate, phenoxy ethyl acrylate (PEA), beta carboxy ethyl acrylate, ethoxyethoxyethyl acrylate (EOEOEA), 6M-ethoxylated 3M-hydroxyethyl methacrylate, cyclic trimethylolpropane formal monoacrylate (CTFA), isodecyl acrylate (IDA), isobornyl acrylate, octyldecyl acrylate, oxyethylated phenol acrylate, glycol monomethacrylate, 6M-ethoxylated 3M-hydroxyethyl methacrylate, propylene glycol monoacrylate, propylene glycol monomethacrylate, odipropylene glycol diacrylate, 1,6-hexanediol diacrylate (HDDA or HDODA), tripropylene glycol diacrylate (TPGDA or TRPGDA), dipropylene glycol diacrylate (DPGDA), propoxylated neopentyl glycol diacrylate (PONPGDA or NPGPODA), propoxylated glycerol triacrylate, PEG200 diacrylate, ethoxylated phenol acrylate, acrylated epoxy bisphenol-A diacrylate (EOBADA), trimethylolpropane triacrylate (TMPTA), ethoxylated TMPTA (EOTMPTA or TMPEOTA), trimethylolpropane trimethacrylate, glycerol propoxylate triacrylate (GPTA), alkoxylated pentaerythritol tetraacrylate (PPTTA), pentaerythritol tri-tetraacrylate (PETA), dipentaerythritol pentaacrylate (DPPA), dipentaerythritol hydroxylpentaacrylate, ditrimethylolpropane tetraacrylate (di-TMPTA), and mixtures thereof.

Similarly, adding under agitation one of vinyl ester solids, unsaturated polyester solids, and mixtures thereof may involve any number of steps and implementing components, and may be accomplished readily from this disclosure. For the exemplary purposes of this disclosure, adding under agitation one of vinyl ester solids, unsaturated polyester solids, and mixtures thereof may comprise adding under agitation one of isophthalic polyester, orthophthalic polyester, terephthalic polyester, and mixtures thereof.

The method implementation for producing a zero VOC coating, laminating, or casting composition may further include the steps of: heating the polymerizable solids and the vinyl ester solids, the unsaturated polyester solids, or the mixtures thereof to a range of about 70° F. to about 100° F.; and adding under agitation at least one photochemical catalyst and/or at least one additive.

Adding under agitation at least one photochemical catalyst may involve any number of steps and implementing components, and adding under agitation at least one photochemical catalyst may be accomplished readily from this disclosure. For the exemplary purposes of this disclosure, adding under agitation at least one photochemical catalyst may comprise adding under agitation one of at least one of benzoin, benzil dimethyl ketal, cyclo hexyl phenyl ketones, acylphosphine oxides (APOs), bisacylphosphine (BAPO), 1-hydroxycyclohexyl phenyl ketone, bis(2,4,6-trimethyl-benzoyl)-phenylphosphine oxide, 2-benzyl 2-dimethylamino 1-(4-morpholinophenyl)butanone-1,1-phenyl-2-hydroxy-2-methyl-1-propanone, oligo {2-hydroxy-2 methyl-1-[4-(methylvinyl)phenyl]propanone}, 2-hydroxy 2-methyl 1-phenyl propan-1 one, bis(2,6-dimethoxybenzoyl)-2,4,4-trimethylpentyl phosphine oxide, benzophenone, bis(n,5,2,4-cyclopentadien-1-yl)-bis[2,6-difluoro-3-(1H-pyrol-1-yl) phenyl]titanium, 2-benzyl-2-N,N-dimethyl amino-1-(4-morpholinophenyl)-1-butanone, 2-methyle-1-[4 (methylthio)-2-morpholinopropan]-1-one, 4-(2-hydroxy) phenyl-2-hydroxy-2-(methylpropyl)ketone, 1-hydroxy cyclohexyl phenyl ketone benzophenone, (n-5,2,4-cyclopentadien-1-yl) [1,2,3,4,5,6-n)-(1-methylethyl) benzene]-iron(+) hexafluorophosphate (−1), 2,2-dimethoxy-2-phenyl-1-acetophen-one 2,4,6-trimethyl benzoyl-diphenyl phosphine oxide, benzoic acid, 4-(dimethyl amino)-ethyl ether, and mixtures thereof.

Likewise, adding under agitation at least one additive may involve any number of steps and implementing components, and adding under agitation at least one additive may be accomplished readily from this disclosure. For the exemplary purposes of this disclosure, adding under agitation at least one additive may comprise adding under agitation at least one of a filler, a reinforcement, a promoter/accelerator, an optical brightener, an opacifying pigment, a thickener, an air release, a defoamer, a grinding aid, a blue dye, a colorant, an inhibitor, an antioxidant, and mixtures thereof.

Thus, zero VOC coating, laminating, or casting composition implementations may comprise: one of vinyl ester solids, unsaturated polyester solids, and mixtures thereof; polymerizable solids for cross-linking the vinyl ester solids, the unsaturated polyester solids, or the mixtures thereof; and/or at least one photochemical catalyst. The unsaturated polyester solids may be one of isophthalic polyester, orthophthalic polyester, terephthalic polyester, and mixtures thereof. The polymerizable solids may be one of a monomer, an oligomer, and mixtures thereof, such as one of monoacrylates, diacrylates, triacrylates, polyacrylates, epoxy acrylates, aromatic urethane acrylates, aliphatic urethane acrylates, polyether acrylates, polyester acrylates, melamine acrylates, acrylic acrylates, and mixtures thereof. Additionally, at least one additive may also be included in the zero VOC composition, such as at least one of a filler, a reinforcement, a promoter/accelerator, an optical brightener, an opacifying pigment, a thickener, an air release, a defoamer, a grinding aid, a blue dye, a colorant, an antioxidant, and inhibitor, and mixtures thereof.

Composition implementations may be cured using conventional or other procedures. Accordingly, although there are a variety of method implementations for curing coating, laminating, and casting compositions, for the exemplary purposes of this disclosure, a method implementation for curing a zero VOC coating, laminating, or casting composition comprising one of vinyl ester solids, unsaturated polyester solids, and mixtures thereof, polymerizable solids, and at least one photochemical catalyst, without requiring evaporation of a VOC there from, may generally include: exposing the zero VOC composition to ultraviolet light to initiate a polymerization reaction in the zero VOC composition and/or mixing the zero VOC composition with at least one thermal catalyst to initiate a polymerization reaction in the zero VOC composition.

Thus, because of the zero VOC coating, laminating, or casting composition implementations, a significant advantage is provided over conventional curing systems. For the first time, a versatile dual cure system is available that allows zero VOC coating, laminating, or casting composition implementations to be cured without requiring evaporation of a VOC by both thermal and photochemical catalysts substantially simultaneously, while still providing the flexibility to cure only by exposing the zero VOC composition to ultraviolet light to initiate a polymerization reaction or by mixing the zero VOC composition with at least one thermal catalyst to initiate a polymerization reaction.

While production and curing implementations of coating, laminating, and casting compositions have been described in particular sequences of steps, it will be understood that such production and curing is not limited to the specific order of steps as disclosed. Any steps or sequences of steps of production and curing implementations of coating, laminating, and casting composition implementations disclosed are given as examples of possible steps or sequences of steps and not as limitations, since various production and curing processes and sequences of steps may be used to produce and cure coating, laminating, or casting composition implementations.

It will be understood that implementations are not limited in their uses, but may encompass a variety of uses, such as architectural, construction, automotive, marine, industrial, electrical, structural, sports, and transportation, and/or the like uses, with similar results. For example, possible uses may be in fiberglass-reinforced shower stalls, boat hulls, truck caps and airfoils, construction panels, and autobody parts and trim. Other uses may be in Breton stone, synthetic marble counter tops and sinks, onyx, and bathtubs. Still other uses may be in gel coats and maintenance coatings. Even other uses may be in solid or hollow fishing rods, filament wound tanks, continuous lamination, flat and corrugated sheets, middle laminating for fishing boats, yachts, etc., buttons, decorative panels for table top, furniture, door, etc., cooling towers, chairs, helmets, and tanks. Yet other uses may be in wood surfacers, musical instruments, autobody filler, heavy vehicle putty, patching and sealing compound.

4. Examples

The following examples further illustrate, not limit, the invention. In particular, these examples illustrate some specific implementations of compositions and their preparation and curing. Although specific components and amounts are disclosed in the following examples, it will be understood that other components and amounts as described previously may be utilized for other implementations.

Example 1

For the exemplary purposes of this disclosure, an opaque gel coating/laminating composition was prepared by mixing together the ingredients in the order listed in Table 1 as follows. First, the resin was added under agitation to the oligomers which were preheated to 300° F. Next, the temperature of the oligomer-resin mixture was reduced to about ambient temperature. Then, the additives were added followed by the photochemical catalysts, all while the composition was continuing to be agitated. The following Table 1 lists the ingredients used in parts by weight, based on the total weight of the opaque gel coating/laminating composition.

TABLE 1

| | |
|---|---|
| Trimethylolpropane ethoxy triacrylate | 17.728 |
| Tripropylene glycol diacrylate | 17.728 |
| Cyclic trimethyl propane formal acrylate | 8.228 |
| Eastman ® orthophthalic solid resin | 44.319 |
| BMC-888 air release | 0.443 |
| BMV-1040S flow and leveling | 0.133 |
| CAB-O-SIL ® | 1.441 |
| Cobalt (12%) | 0.025 |
| $TiO_2$ | 3.964 |
| UVITEX | 0.614 |
| Blue dye | 0.614 |
| 1-hydroxycyclohexyl phenyl ketone | 1.881 |
| bis(2,4,6-trimethylbenzoyl)-phenylphosphine oxide | 1.881 |
| 2-benzyl 2-dimethyiamino 1-(4-morpholinophenyl)butanone-1 | 0.4703 |

Example 2

For the exemplary purposes of this disclosure, a clear gel coating/laminating composition was prepared in the manner outlined in Example 1 above, but without admixing $TiO_2$. The following Table 2 lists the ingredients used in parts by weight, based on the total weight of the clear gel coating/laminating composition.

TABLE 2

| | |
|---|---|
| Trimethylolpropane ethoxy triacrylate | 17.728 |
| Tripropylene glycol diacrylate | 17.728 |
| Cyclic trimethyl propane formal acrylate | 8.228 |
| Eastman ® orthophthalic solid resin | 44.319 |
| BMC-888 | 0.443 |
| BMV-1040S | 0.133 |
| CAB-O-SIL ® | 1.441 |
| Cobalt (12%) | 0.025 |
| UVITEX | 0.614 |
| Blue dye | 0.614 |
| Antioxidant | 1.982 |
| Inhibitor | 1.982 |
| 1-hydroxycyclohexyl phenyl ketone | 1.881 |
| bis(2,4,6-trimethylbenzoyl)-phenylphosphine oxide | 1.881 |
| 2-benzyl 2-dimethyiamino 1-(4-morpholinophenyl)butanone-1 | 0.4703 |

Example 3

For the exemplary purposes of this disclosure, a barrier coating composition was prepared in the manner outlined in Example 1 above with the addition of filler and reinforcement. The following Table 3 lists the ingredients used in parts by weight, based on the total weight of the barrier coating composition.

TABLE 3

| | |
|---|---|
| Trimethylolpropane ethoxy triacrylate | 14.498 |
| Tripropylene glycol diacrylate | 14.498 |
| Cyclic trimethyl propane formal acrylate | 6.728 |
| Eastman ® orthophthalic solid resin | 36.243 |
| BMC-888 | 0.443 |
| BMV-1040S | 0.133 |
| CAB-O-SIL ® | 1.441 |
| Cobalt (12%) | 0.025 |
| Aluminum silicate | 10.000 |
| Glass fibers | 10.000 |
| UVITEX | 0.614 |
| Blue dye | 0.614 |
| 1-hydroxycyclohexyl phenyl ketone | 1.881 |

TABLE 3-continued

| | |
|---|---|
| bis(2,4,6-trimethylbenzoyl)-phenylphosphine oxide | 1.881 |
| 2-benzyl 2-dimethyiamino 1-(4-morpholinophenyl)butanone-1 | 0.4703 |

Example 4

For the exemplary purposes of this disclosure, a casting composition was prepared in a similar manner as that outlined in Example 1 above with the addition of filler. The following Table 4 lists the ingredients used in parts by weight, based on the total weight of the casting composition. Once the ingredients of Table 4 were mixed, the filler $CaCo_3$ was added at a 3 to 1 ratio.

TABLE 4

| | |
|---|---|
| Trimethylolpropane ethoxy triacrylate | 17.728 |
| Tripropylene glycol diacrylate | 17.728 |
| Cyclic trimethyl propane formal acrylate | 8.228 |
| Eastman ® orthophthalic solid resin | 44.319 |
| BMC-888 air release | 0.443 |
| BMV-1040S flow and leveling | 0.133 |
| CAB-O-SIL ® | 1.441 |
| Cobalt (12%) | 0.025 |
| $TiO_2$ | 3.964 |
| UVITEX | 0.614 |
| Blue dye | 0.614 |
| 1-hydroxycyclohexyl phenyl ketone | 1.881 |
| bis(2,4,6-trimethylbenzoyl)-phenylphosphine oxide | 1.881 |
| 2-benzyl 2-dimethyiamino 1-(4-morpholinophenyl)butanone-1 | 0.4703 |

Example 5

The compositions of Examples 1-3 were each sprayed onto a surface with plural component spray equipment using an air pressure of approximately 20-60 lbs. The compositions were then exposed only to UV light from a medium pressure mercury lamp with a peak spectral output in the range of 180-420 nanometers, inclusive, for 1-5 seconds to initiate a polymerization reaction.

The compositions of Examples 1-3 were each also mixed only with methyl ethyl ketone peroxide (MEKP) and cumene hydroperoxide at 1.200 and 0.400 parts by weight respectively to initiate a polymerization reaction. The compositions were then sprayed onto a surface with plural component spray equipment using an air pressure of approximately 20-60 lbs.

The compositions of Examples 1-3 were each also mixed with MEKP and cumene hydroperoxide at 1.200 and 0.400 parts by weight respectively to initiate a polymerization reaction. Next, the compositions were sprayed onto a surface with plural component spray equipment using an air pressure of approximately 20-60 lbs. Then, the compositions were exposed to UV light from a medium pressure mercury lamp with a peak spectral output in the range of 180-420 nanometers, inclusive, for 1-5 seconds to also initiate a polymerization reaction.

In each of the foregoing cases, no evaporation of any VOC was required to complete the curing of the compositions.

The implementations and examples set forth in the Description were presented in order to explain the invention and its practical applications and enable the making and using of the invention. However, the implementations and examples have been presented for the purposes of illustration and example only. Further implementations are within the following claims. The Description is not intended to be exhaustive or to limit the invention to the precise form disclosed. Many modifications and variations are possible in light of the teachings above without departing from the spirit and scope of the forthcoming claims.

Accordingly, any components indicated in this document are given as an example of possible components and not as a limitation. Similarly, any steps or sequence of steps of the methods indicated in this document are given as examples of possible steps or sequence of steps and not as limitations, since numerous processes and sequences of steps may be used to produce and cure coating, laminating, and casting compositions.

The invention claimed is:

1. A zero volatile organic compound (VOC) liquid composition comprising:
   one of vinyl ester polymer solids, unsaturated polyester polymer solids, and mixtures thereof; and
   polymerizable polymer solids for cross-linking the vinyl ester polymer solids, the unsaturated polyester polymer solids, or the mixtures thereof;
   wherein the zero VOC liquid composition is curable, without requiring evaporation of any VOC therefrom, upon one of:
      exposure to ultraviolet light;
      mixing with at least one thermal catalyst; and
      mixing with at least one thermal catalyst and exposure to ultraviolet light.

2. The composition of claim 1, wherein the composition is one of a coating composition, a laminating composition, and a casting composition.

3. The composition of claim 1, wherein the unsaturated polyester polymer solids is one of isophthalic polyester, orthophthalic polyester, terephthalic polyester, and mixtures thereof.

4. The composition of claim 1, wherein the vinyl ester polymer solids, the unsaturated polyester polymer solids, or the mixtures thereof comprises a percent by weight, based on the total composition weight, of from about 0% to about 90%.

5. The composition of claim 1, wherein the polymerizable polymer solids is one of a monomer, an oligomer, and mixtures thereof.

6. The composition of claim 5, wherein the polymerizable polymer solids is one of monoacrylates, diacrylates, triacrylates, polyacrylates, epoxy acrylates, aromatic urethane acrylates, aliphatic urethane acrylates, polyether acrylates, polyester acrylates, melamine acrylates, acrylic acrylates, and mixtures thereof.

7. The composition of claim 6, wherein the polymerizable polymer solids is one of methyl acrylate, vinyl acetate, acrylinonitrile, n-butyl acrylate, ethyl acrylate, hydroxyethyl acrylate, hydroxyethyl methacrylate, pentaerythritol triacrylate, phenoxy ethyl acrylate (PEA), beta carboxy ethyl acrylate, ethoxyethoxyethyl acrylate (EOEOEA), 6M-ethoxylated 3M-hydroxyethyl methacrylate, cyclic trimethylolpropane formal monoacrylate (CTFA), isodecyl acrylate (IDA), isobornyl acrylate, octyldecyl acrylate, oxyethylated phenol acrylate, glycol monomethacrylate, 6M-ethoxylated 3M-hydroxyethyl methacrylate, propylene glycol monoacrylate, propylene glycol monomethacrylate, odipropylene glycol diacrylate, 1,6-hexanediol diacrylate (HDDA or HDODA), tripropylene glycol diacrylate (TPGDA or TRPGDA), dipropylene glycol diacrylate (DPGDA), propoxylated neopentyl glycol diacrylate (PONPGDA or NPGPODA), propoxylated glycerol triacrylate, PEG200 diacrylate, ethoxylated phenol acrylate, acrylated epoxy bisphenol-A diacrylate (EOBADA), trimethylolpropane triacrylate (TMPTA), ethoxylated TMPTA (EOTMPTA or TMPEOTA), trimethylolpropane trimethacrylate, glycerol propoxylate triacrylate (GPTA), alkoxylated pentaerythritol tetraacrylate (PPTTA), pentaerythritol tri-tetraacrylate (PETA), dipentaerythritol pentaacrylate (DPPA), dipentaerythritol hydroxyl pentaacrylate, ditrimethylolpropane tetraacrylate (di-TMPTA), and mixtures thereof.

8. The composition of claim 1, wherein the polymerizable polymer solids comprises a percent by weight, based on the total composition weight, of from about 0% to about 90%.

* * * * *